United States Patent
Zou

(10) Patent No.: US 10,656,472 B2
(45) Date of Patent: May 19, 2020

(54) LIQUID CRYSTAL DISPLAY PANEL AND DISPLAY DEVICE

(71) Applicant: BOE Technology Group Co., LTd., Beijing (CN)

(72) Inventor: Xiangxiang Zou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 190 days.

(21) Appl. No.: 15/822,096

(22) Filed: Nov. 24, 2017

(65) Prior Publication Data

US 2018/0299716 A1  Oct. 18, 2018

(30) Foreign Application Priority Data

Apr. 12, 2017 (CN) .......................... 2017 1 0237196

(51) Int. Cl.
| | |
|---|---|
| *G02F 1/1339* | (2006.01) |
| *G02F 1/1362* | (2006.01) |
| *G02F 1/1335* | (2006.01) |

(52) U.S. Cl.
CPC .... *G02F 1/13394* (2013.01); *G02F 1/133514* (2013.01); *G02F 1/136286* (2013.01); *G02F 2001/13398* (2013.01)

(58) Field of Classification Search
CPC .......... G02F 1/13394; G02F 1/136286; G02F 1/133514; G02F 2001/13398;
(Continued)

(56) References Cited

U.S. PATENT DOCUMENTS 9,448,448 B2 * 9/2016 Tomioka ........... G02F 1/133512
9,494,835 B2 * 11/2016 Nomura .............. G02F 1/13394
(Continued)

FOREIGN PATENT DOCUMENTS

| CN | 202033558 | 11/2011 |
|---|---|---|
| CN | 103676335 | 3/2014 |

(Continued)

OTHER PUBLICATIONS

The State Intellectual Property Office of People's Republic of China, "First Office Action," issued in connection with Chinese Patent Application No. 201710237196.X, dated Mar. 29, 2019, 15 pages.

*Primary Examiner* — Huyen L Ngo
(74) *Attorney, Agent, or Firm* — Arent Fox LLP; Michael Fainberg

(57) ABSTRACT

Disclosed relate to display technologies, a liquid crystal display panel and a display device. The liquid crystal display panel includes a color filter substrate and an array substrate to be connected by box aligning; positioners protruding toward the color filter substrate are arranged on a side of the array substrate facing the color filter substrate, at least one of the positioners is arranged between every two adjacent pixels; each positioner includes two stoppers distributed in an extension direction of data line in the array substrate; spacers protruding toward the array substrate are arranged on a side of the color filter substrate facing the array substrate; each spacer is arranged facing one of the positioners; an end of each spacer facing the array substrate contacts the positioner, and can slide relative to the positioner in the extension direction; each stopper contacts the spacer when the spacer slides relative to the positioner.

15 Claims, 3 Drawing Sheets

(58) Field of Classification Search
CPC ......... G02F 2001/13396; G02F 1/1362; G02F 2201/123; G02F 1/13392; A61H 2201/5043; G06F 1/16
See application file for complete search history.

(56) References Cited

U.S. PATENT DOCUMENTS

| | | | | |
|---|---|---|---|---|
| 9,759,955 | B2* | 9/2017 | Ishikawa | G02F 1/13394 |
| 9,837,445 | B2* | 12/2017 | Han | H05K 999/99 |
| 10,018,877 | B2* | 7/2018 | Cho | G02F 1/1337 |
| 10,198,105 | B2* | 2/2019 | Shim | G02F 1/13338 |

FOREIGN PATENT DOCUMENTS

| | | |
|---|---|---|
| CN | 104330924 A | 2/2015 |
| CN | 105842930 | 8/2016 |
| CN | 105911774 A | 8/2016 |

* cited by examiner

LIQUID CRYSTAL DISPLAY PANEL AND DISPLAY DEVICE

CROSS-REFERENCE TO RELATED APPLICATION

This application claims priority of Chinese Patent Application No. 201710237196.X, filed on Apr. 12, 2017, which is hereby incorporated by reference in its entirety.

FIELD

This disclosure relates to the field of display technologies, and particularly to a liquid crystal display panel and a display device.

BACKGROUND

A liquid crystal display panel includes an array substrate and a color filter substrate arranged opposite to each other, and a liquid crystal layer arranged between two aforementioned substrates. In order to maintain a uniform liquid crystal cell gap, a plurality of spacers distributed in an array need to be arranged between the array substrate and the color filter substrate in such a way that generally the spacers have one ends fixed on the color filter substrate, and the other ends abutting on the array substrate, so that there is some distance maintained between the array substrate and the color filter substrate.

SUMMARY

An embodiment of this disclosure provides a liquid crystal display panel including a color filter substrate and an array substrate which are connected by box aligning, wherein a plurality of positioners protruding toward the color filter substrate are arranged on a side of the array substrate facing the color filter substrate, at least one of the positioners is arranged between every two adjacent pixels, and each of the positioners comprises two stoppers distributed in an extension direction of data line in the array substrate; a plurality of spacers protruding toward the array substrate are arranged on a side of the color filter substrate facing the array substrate, and each of the spacers is arranged facing one of the positioners; and an end of each of the spacers facing the array substrate contacts a positioner faced by itself, and can slide relative to the positioner in the extension direction of data line; and each of the stoppers is configured to contact with a spacer faced by itself when the spacer slides relative to the positioner to thereby limit a moving distance of the spacer in the extension of data line over a distance.

Optionally, there is a slide groove on an end facing the array substrate, of each of the spacers, and an extension direction of each of the slide groves is parallel to the extension direction of data line; and a part of the positioner faced by a spacer is embedded into the slide groove, so that the spacer can slide relative to the positioner faced by itself.

Optionally, a width of an end of the stopper proximate to an adjacent pixel is greater than a width of an end thereof away from the adjacent pixel in each of the positioners.

Optionally, the width of the end of the stopper proximate to the adjacent pixel is greater than a width of the slide groove of the spacer faced by the stopper.

Optionally, wherein widths of two ends of the stopper in the extension direction of the data line are equal to each other, and there is an angle between an extension direction of the stopper and the extension direction of the data line.

Optionally, a projection of the stopper onto a plane where the data line lie is a trapezium, so that a width of two end sections of the positioner in the extension direction of data line are greater than a width of a middle section thereof.

Optionally, an angle between the extension direction of the stopper and the extension direction of data line is greater than 0° and less than 90°.

Optionally, an angle between the extension direction of the stopper and the extension direction of data line is 15°, 30°, 45°, 60°, or 75°.

Optionally, angles between the extension directions of two stoppers in the positioner and the extension direction of data line lie on a same side in the extension direction of data line.

Optionally, angles between the extension directions of two stoppers in the positioner and the extension direction of data line lie respectively on two sides in the extension direction of data line.

Optionally, a width of the spacer in the extension direction of data line is less than a width of the spacer in an extension direction of gate line in the array substrate.

Optionally, the positioner is arranged in an area covered by a gate line pattern in the array substrate.

Optionally, a rigidity of a material of the positioner is higher than a rigidity of a material of the spacer.

Optionally, the positioner is made of an inorganic material, and the spacer is made of an organic material.

An embodiment of this disclosure further provides a display device including the liquid crystal display panel above.

DETAILED DESCRIPTION OF THE EMBODIMENTS

Figure 1:
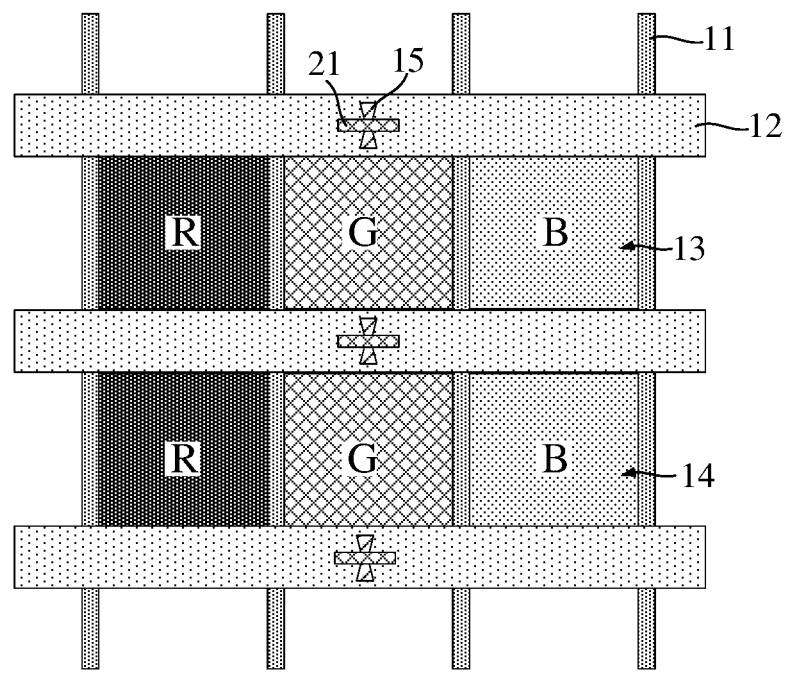
FIG. 1 is a schematic structural diagram of a part of a liquid crystal display panel according to some embodiments.

The technical solutions according to embodiments of this disclosure will be described below clearly and fully with reference to the drawings in embodiments of this disclosure, and apparently embodiments to be described are only a part but not all of embodiments of this disclosure. Based upon embodiments of this disclosure, all the other embodiments which can occur to those ordinarily skilled in the art without any inventive effort shall fall into the scope of this disclosure as claimed.

An embodiment of the disclosure provides a liquid crystal display panel so as to address the problem in the related art of degrading the display effect of the liquid crystal display pane, and shortening the service lifetime of the liquid crystal display panel because an alignment film in a pixel area tends to be scratched by the spacers in the liquid crystal display panel.

The liquid crystal display panel according to embodiments of this disclosure includes a color filter substrate and an array substrate which are connected by box aligning. a plurality of positioners protruding toward the color filter substrate are arranged on the side of the array substrate facing the color filter substrate, each positioner is arranged between two adjacent pixels, and each positioner includes two stoppers distributed in an extension direction of data line; optionally one or more positioners can be arranged between every two adjacent pixels, each positioner can be located between two adjacent pixels in an extension direction of gate line, or can be located between two adjacent pixels in the extension direction of data line; and each positioner includes two stoppers distributed in the extension direction of data line, and optionally the two stoppers can be connected directly or through a connector.

A plurality of spacers protruding toward the array substrate is arranged on the side of the color filter substrate facing the array substrate. Each spacer is arranged between two adjacent pixels and faces to the positioner between every two adjacent pixels. The end of each spacer facing the array substrate contacts the positioner faced by the spacer. Each spacer can slide relative to the positioner faced by the spacer in the extension direction of data line, and when the array substrate and the color filter substrate are connected by box aligning, the plurality of spacers, and the plurality of positioners faced by the spacers support the array substrate and the color filter substrate to thereby form a uniform liquid crystal cell gap the array substrate and the color filter substrate; and when an external force or an internal stress is applied to the liquid crystal display panel, each spacer can slide relative to the positioner faced by the spacer in the extension direction of data line.

The spacers in the liquid crystal display panel in the related art tend to move into the pixel area while they are sliding, thus scratching the alignment film in the pixel area. In the liquid crystal display panel according to embodiments of this disclosure, each positioner includes two stoppers, and each stopper is configured to contact with the corresponding spacer facing to the positioner when the spacer slides relative to the positioner to thereby limit a moving distance of the corresponding spacer in the extension of data line.

A principle of the liquid crystal display panel according to embodiments of this disclosure will be described with reference to embodiments thereof, where the distance over which a spacer slides between two pixels is shortened to thereby lower the probability that the spacer slides into a pixel area so as to alleviate the problem of degrading the display effect and the service lifetime of the liquid crystal display panel because the spacer scratches an alignment film in the pixel area.

FIG. 1 is a schematic structural diagram of a part of a liquid crystal display panel according to some embodiments, and for the sake of a convenient description, FIG. 1 illustrates only such a part of a pixel area that includes two adjacent pixels on an array substrate, and a part of spacers in the part of the pixel area, where a color filter substrate is not illustrated. The pixels 13 and 14 illustrated in FIG. 1 include three sub-pixels arranged as R, G, and B, and each sub-pixel is located in an area surrounded by two gate lines 12, and two data lines 11 intersecting with the gate lines.

Figure 2:
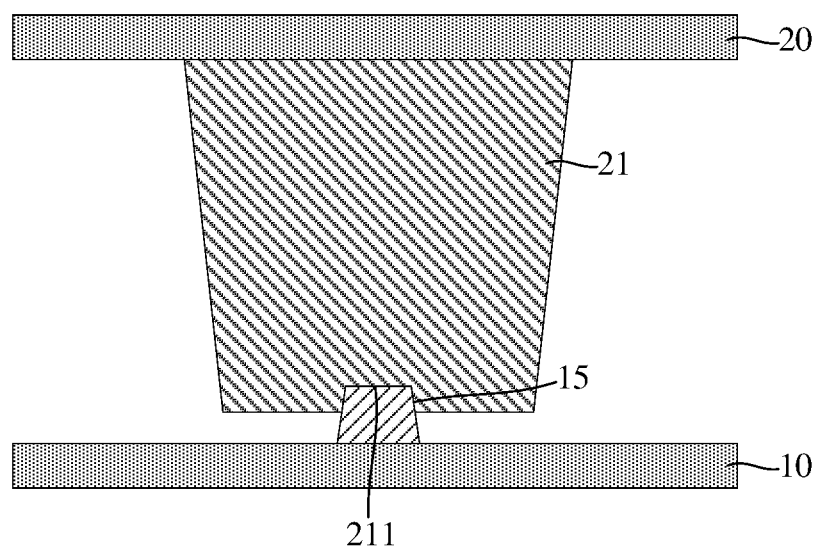
FIG. 2 is a schematic structural diagram of a cross-section of a part of a liquid crystal display panel according to some embodiments in a sectional view.

Referring to FIG. 2 which is a schematic structural diagram of a liquid crystal display panel according to some embodiments of the disclosure in a sectional view taken through a spacer 21. In order to enable each spacer 21 to slide relative to a positioner 15 facing by the spacer in the extension direction of data line, as illustrated in FIG. 2, there is a slide groove 211 on the end of each spacer 21 facing the array substrate 10, and the extension direction of each slide grove 211 is parallel to the extension direction of data line; and a part of the positioner 15 faced by each spacer 21 is embedded into the slide groove 211, so that each spacer 21 can slide relative to the positioner 15 faced by the spacer along the slide groove 211 thereof.

It shall be noted that in an implementation, a method for fabricating the slide groove 211 of each spacer 21 can be embodied in the following implementations.

In a first implementation, the rigidity of the material of the positioner 15 is higher than the rigidity of the material of the spacer 21, and after the spacer 21 is formed on the color filter substrate 20, the slide groove 211 is not formed directly on the spacer 21; and after the color filter substrate 20 and the array substrate 10 are connected by box aligning, each spacer 21 is extruded by the positioner 15 facing the spacer and thus deformed, so that a part of the positioner 15 is embedded into the spacer 21, and thus the slide groove 211 is formed on the spacer 21, where the positioner 15 can be made of an inorganic material (e.g., silicon nitride, silicon oxynitride, etc.); and the spacer 21 can be made of an organic material (e.g., an organic resin material).

In a second implementation, after the spacer 21 is formed on the color film substrate 20, the slide groove 211 is formed directly on each spacer 21, and when the color filter substrate 20 and the array substrate 10 are connected by box aligning, each positioner 15 is embedded into the corresponding slide groove 211 of the spacer facing the positioner.

In the liquid crystal display panel according to some embodiments, the width of the end of each stopper 151 proximate to an adjacent pixel is greater than the width of the end thereof away from the pixel in each positioner 15, that is, in this embodiment, projections of both stoppers 151 in each positioner 15 onto the plane where data lines lie are trapeziums, so that the widths of two end sections of the positioner 15 are more than the width of a middle section thereof.

Figure 3:
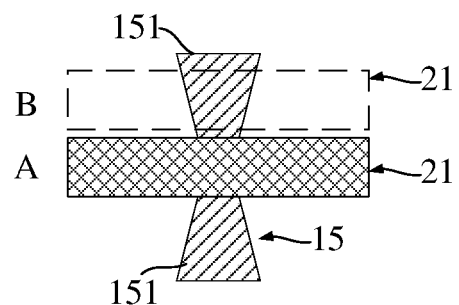
FIG. 3 is a schematic diagram of a moving positional relationship between a spacer and a positioner in a liquid crystal display panel according to some embodiments.

Referring to FIG. 3 which is a schematic diagram of a positional relationship of a spacer 21 moving relative to a positioner 15 faced by the spacer in a liquid crystal display panel according to some embodiments, when the spacer 21 slides relative to the positioner 15 faced by the spacer due to an external force or an internal stress applied thereto, so that the spacer 21 moves from the position A to the position B in the direction toward an adjacent pixel, since the width of the end of a stopper 151 proximate to the adjacent pixel is greater than the width of the end thereof away from the pixel, there is an increasing contact area between the moving spacer 21 and the stopper 151, and there is also an increasing resistance between them, so that the spacer 21 is alleviated from sliding on the positioner 15 faced by the spacer over a distance, and thus restrained from further sliding on the positioner 15 faced by the spacer.

In this embodiment, in order to further restrain the spacer 21 from further sliding on the positioner 15 to thereby prevent the spacer 21 from sliding into the pixel area, optionally the width of the end of each stopper 151 proximate to the adjacent pixel is greater than the width of a slide groove 211 of the spacer 21 faced by the stopper, so that when the spacer 21 slides onto the positioner 15 by a width greater than the width of the slide groove 211, the part on the positioner 15 wider than the slide groove 211 is locked by the slide groove 211, so that the spacer 21 is prevented from sliding on the positioner 15 faced by the spacer, thus further lowering the probability that the spacer 21 slides into the pixel area.

In order to further lower the probability that the spacer 21 slides into the pixel area while the spacer 21 is operating to support the array substrate 10 and the color filter substrate 20, referring to FIG. 1, the width of each spacer 21 in the extension direction of the data lines 11 is less than the width of the spacer 21 in the extension direction of the gate lines 12, that is, each spacer 21 is structured in a strip shape with the longer side thereof extending along the gate lines 12, and the shorter side thereof extending along the data lines 11. There is a larger distance between the spacer 21 in this structure and each pixel in the extension direction of the data lines 11, thus further lowering the probability that the spacer 21 slides into the pixel area.

Optionally the spacer 21 in some embodiments can be arranged between two adjacent pixels in the extension direction of gate line, or can be arranged between two adjacent pixels in the extension direction of data line. Since the width of a gate line on the array substrate 10 is greater than the width of a data line, the positioner 15 is arranged in an area covered by a gate line pattern to thereby facilitate the fabrication of the positioner 15. In some embodiments, each positioner 15 is arranged in the area covered by the gate line pattern in the array substrate 10 as illustrated in FIG. 1.

Figure 4:
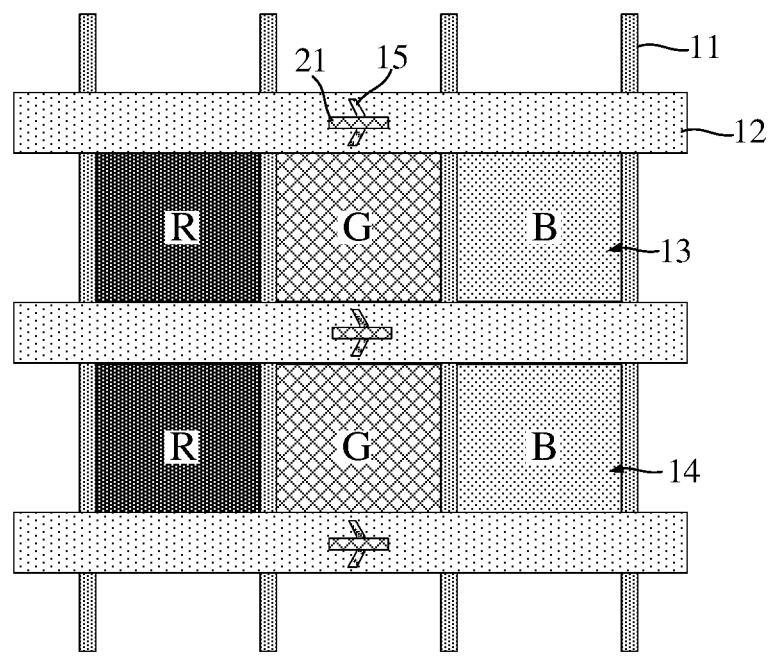
FIG. 4 is a schematic structural diagram of a part of a liquid crystal display panel according to some embodiments.

Referring to FIG. 4 which is a schematic structural diagram of a part of a liquid crystal display panel according to some embodiments, and for the sake of a convenient description, FIG. 4 illustrates only such a part of a pixel area that includes two adjacent pixels on an array substrate 10, and a part of spacers 21 in the part of the pixel area, where a color filter substrate is not illustrated. The pixels 13 and 14 illustrated in FIG. 4 include three sub-pixels arranged as R, G, and B, and each sub-pixel is located in an area surrounded by two gate lines, and two data lines intersecting with the gate lines.

In the liquid crystal display panel according to some embodiments, there is also a slide groove 211 on the end of each spacer 21 facing the array substrate 10, and the extension direction of each slide grove 211 is parallel to extension direction of the data lines 11; and a part of the positioner 15 faced by each spacer 21 is embedded into the slide groove 211 of the spacer, so that each spacer 21 can slide relative to the positioner 15 faced by the spacer. Reference can be made to embodiments above for a particular structure thereof, so a repeated description thereof will be omitted here.

It shall be noted that like the embodiment above, in an implementation, a method for fabricating the slide groove 211 of each spacer 21 can be embodied in the following implementations.

In a first implementation, the rigidity of the material of the positioner 15 is higher than the rigidity of the material of the spacer 21, and after the spacer 21 is formed on the color filter substrate 20, the slide groove 211 is not formed directly on the spacer 21; and after the color filter substrate 20 and the array substrate 10 are connected by box aligning, each spacer 21 is extruded by the corresponding positioner 15 facing the spacer and thus deformed, so that a part of the corresponding positioner 15 is embedded into the spacer 21, and thus the slide groove 211 is formed on the spacer 21, where the positioner 15 can be made of an inorganic material (e.g., silicon nitride, silicon oxynitride, etc.); and the spacer 21 can be made of an organic material (e.g., an organic resin material).

In a second implementation, after the spacer 21 is formed on the color film substrate 20, the slide groove 211 is formed directly on each spacer 21, and when the color filter substrate 20 and the array substrate 10 are connected by box aligning, each positioner 15 is embedded into the corresponding slide groove 211 of the spacer facing the positioner.

Further referring to FIG. 4, in the liquid crystal display panel according to some embodiments, the widths of two ends of each stopper 151 in the extension direction of the data lines 11 are equal to each other, and there is an angle between the extension direction of each stopper and the extension direction of the data lines 11. Optionally each stopper 151 can be structured in a straight line or an arc. When the spacer 21 slides relative to the positioner 15 faced by the spacer, and thus contacts with either stopper 151, the spacer may be guided by the stopper 151 to move in the extension direction of the stopper 151.

Figure 5:
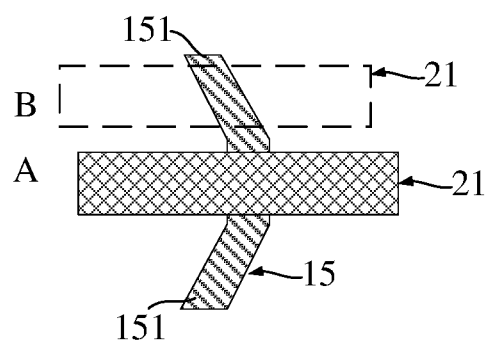
FIG. 5 is a schematic diagram of a moving positional relationship between a spacer and a positioner in a liquid crystal display panel according to some other embodiments.

Referring to FIG. 5 which is a schematic diagram of a positional relationship of a spacer 21 moving relative to a positioner 15 faced by the spacer in a liquid crystal display panel according to some embodiments, when the spacer 21 slides relative to the positioner 15 faced by the spacer due to an external force or an internal stress applied thereto, so that the spacer 21 moves from the position A to the position B in the direction toward an adjacent pixel, since the spacer 21 coming into contact with either stopper 151 is guided by the stopper 151 to move in the extension direction of the stopper 151, the movement of the spacer 21 in the extension direction of the stopper 151 is equivalent to the resultant movement of the spacer 21 in the extension direction of the data lines 11 and the extension direction of the gate lines 12, so the spacer 21 moves in the extension direction of the data lines 11 over a shorter distance given a total movement journey of the spacer 21. Optionally when there is no angle between the extension direction of the stopper 151 and the extension direction of the data lines 11, if the spacer 21 moves relative to the positioner 15 faced by the spacer over a distance a due to a force applied thereto, then when there is an angle $\theta$ between the extension direction of the stopper 151 and the extension direction of the data lines 11, then the spacer 21 will move in the extension direction of the data lines 11 over a distance of $a*\cos\theta$. Since $a*\cos\theta$ is less than a, apparently the probability that the spacer 21 moves into the pixel area can be lowered due to the positioner 15 in the liquid crystal display panel according to the embodiment above.

In an optional implementation, the angle between the extension direction of the stopper 151 and the extension direction of the data lines 11 shall be determined according to a limited distance over which the spacer 21 moves in the extension direction of the data lines 11, and in the embodiment above, the angle between the extension direction of each stopper 151 and the extension direction of the data lines 11 is greater than 0° and less than 90°, and optionally 15°, 30°, 45°, 60°, or 75° in an order of an ascending limited distance over which the spacer 21 moves in the extension direction of the data lines 11.

In some embodiments, the angles between the extension directions of two stoppers 151 of each positioner 15 and the extension direction of the data lines 11 can lie on the same side or two sides in the extension direction of the data lines 11, and referring to FIG. 4 and FIG. 5, the angles between the extension directions of two stoppers 151 in each positioner 15 and the extension direction of the data lines 11 lie on the same side in the extension direction of the data lines 11 in some embodiments.

Figure 6:
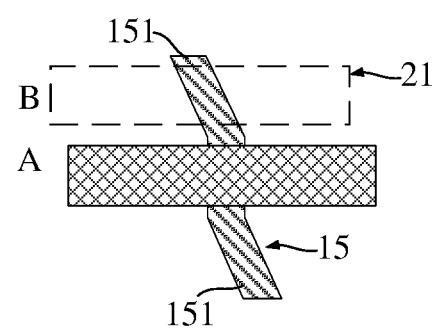
FIG. 6 is a schematic diagram of a moving positional relationship between a spacer, and a positioner in another structure, in a liquid crystal display panel according to some other embodiments.

Referring to FIG. 6, the angles between the extension directions of two stoppers 151 in each positioner 15 and the extension direction of the data lines 11 lie respectively on two sides in the extension direction of the data lines 11 in some other embodiments.

In some embodiments, the width of each spacer 21 in the extension direction of the data lines 11 is less than the width of the spacer 21 in the extension direction of the gate lines 12, and each positioner 15 is arranged in an area covered by a gate line pattern in the array substrate 10. Reference can be made to the embodiments above for an implementation thereof, so a repeated description thereof will be omitted here.

An embodiment of this disclosure further provides a display device including the liquid crystal display panel according to any one of the embodiments above.

In this display device, also the distance over which a spacer in the liquid crystal display panel moves between two pixels can be shortened to thereby lower the probability that the spacer slides into a pixel area so as to alleviate the problem of degrading the display effect and the service lifetime of the liquid crystal display panel because the spacer scratches an alignment film in the pixel area. Reference can be made to the embodiments above for an implementation thereof, so a repeated description thereof will be omitted here.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A liquid crystal display panel, comprising a color filter substrate and an array substrate which are connected by box aligning, wherein:
a plurality of positioners protruding toward the color filter substrate are arranged on a side of the array substrate facing the color filter substrate, at least one of the positioners is arranged between every two adjacent pixels, and each of the positioners comprises two stoppers distributed in an extension direction of data line in the array substrate;
a plurality of spacers protruding toward the array substrate are arranged on a side of the color filter substrate facing the array substrate, and each of the spacers is arranged facing one of the positioners; and an end of each of the spacers facing the array substrate contacts a positioner faced by itself, and can slide relative to the positioner in the extension direction of data line; and
each of the stoppers is configured to contact with a spacer faced by itself when the spacer slides relative to the positioner to thereby limit a moving distance of the spacer in the extension of data line over a distance.

2. The liquid crystal display panel according to claim 1, wherein there is a slide groove on an end facing the array substrate, of each of the spacers, and an extension direction of each of the slide groves is parallel to the extension direction of data line; and
a part of the positioner faced by a spacer is embedded into the slide groove, so that the spacer can slide relative to the positioner faced by itself.

3. The liquid crystal display panel according to claim 2, wherein a width of an end of the stopper proximate to an adjacent pixel is greater than a width of an end thereof away from the adjacent pixel in each of the positioners.

4. The liquid crystal display panel according to claim 3, wherein the width of the end of the stopper proximate to the adjacent pixel is greater than a width of the slide groove of the spacer faced by the stopper.

5. The liquid crystal display panel according to claim 2, wherein widths of two ends of the stopper in the extension direction of the data line are equal to each other, and there is an angle between an extension direction of the stopper and the extension direction of the data line.

6. The liquid crystal display panel according to claim 2, wherein a projection of the stopper onto a plane where the data line lie is a trapezium, so that a width of two end sections of the positioner in the extension direction of data line are greater than a width of a middle section thereof.

7. The liquid crystal display panel according to claim 5, wherein an angle between the extension direction of the stopper and the extension direction of data line is greater than 0° and less than 90°.

8. The liquid crystal display panel according to claim 5, wherein an angle between the extension direction of the stopper and the extension direction of data line is 15°, 30°, 45°, 60°, or 75°.

9. The liquid crystal display panel according to claim 5, wherein angles between the extension directions of two stoppers in the positioner and the extension direction of data line lie on a same side in the extension direction of data line.

10. The liquid crystal display panel according to claim 5, wherein angles between the extension directions of two stoppers in the positioner and the extension direction of data line lie respectively on two sides in the extension direction of data line.

11. The liquid crystal display panel according to claim 1, wherein a width of the spacer in the extension direction of data line is less than a width of the spacer in an extension direction of gate line in the array substrate.

12. The liquid crystal display panel according to claim 11, wherein the positioner is arranged in an area covered by a gate line pattern in the array substrate.

13. The liquid crystal display panel according to claim 1, wherein a rigidity of a material of the positioner is higher than a rigidity of a material of the spacer.

14. The liquid crystal display panel according to claim 13, wherein the positioner is made of an inorganic material, and the spacer is made of an organic material.

15. A display device, comprising the liquid crystal display panel according to claim 1.

* * * * *